US008989940B1

(12) United States Patent
Heap et al.

(10) Patent No.: US 8,989,940 B1
(45) Date of Patent: Mar. 24, 2015

(54) METHOD AND APPARATUS FOR CONTROLLING A MULTI-MODE POWERTRAIN SYSTEM

(71) Applicant: GM Global Technology Operations LLC, Detroit, MI (US)

(72) Inventors: Anthony H. Heap, Ann Arbor, MI (US); Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 14/031,680

(22) Filed: Sep. 19, 2013

(51) Int. Cl.
*B60W 20/00* (2006.01)
*B60W 10/10* (2012.01)

(52) U.S. Cl.
CPC ............ *B60W 20/108* (2013.01); *B60W 10/10* (2013.01); *Y10S 903/945* (2013.01)
USPC .................. 701/22; 701/36; 701/51; 701/55; 701/56; 701/67; 701/69; 701/70; 701/99; 903/945

(58) Field of Classification Search
None
See application file for complete search history.

(56) References Cited

U.S. PATENT DOCUMENTS

| 7,110,871 | B2 * | 9/2006 | Hubbard et al. | 701/54 |
|---|---|---|---|---|
| 7,585,249 | B2 * | 9/2009 | Sah | 477/3 |
| 7,987,934 | B2 * | 8/2011 | Huseman | 180/65.21 |
| 8,092,339 | B2 * | 1/2012 | Heap et al. | 477/5 |
| 8,170,764 | B2 * | 5/2012 | Kaminsky et al. | 701/70 |
| 8,187,145 | B2 * | 5/2012 | Kaminsky et al. | 477/5 |
| 8,560,154 | B2 * | 10/2013 | Hansen et al. | 701/22 |
| 2005/0080538 | A1 * | 4/2005 | Hubbard et al. | 701/54 |
| 2005/0080539 | A1 * | 4/2005 | Hubbard et al. | 701/54 |
| 2005/0252305 | A1 * | 11/2005 | Hubbard et al. | 73/860 |
| 2009/0115349 | A1 * | 5/2009 | Heap | 318/8 |
| 2009/0115351 | A1 * | 5/2009 | Heap et al. | 318/8 |
| 2009/0118077 | A1 * | 5/2009 | Hsieh et al. | 477/3 |
| 2009/0118081 | A1 * | 5/2009 | Heap et al. | 477/3 |
| 2009/0118094 | A1 * | 5/2009 | Hsieh et al. | 477/110 |
| 2009/0118915 | A1 * | 5/2009 | Heap et al. | 701/51 |
| 2009/0118917 | A1 * | 5/2009 | Sah et al. | 701/54 |
| 2009/0118930 | A1 * | 5/2009 | Heap et al. | 701/54 |
| 2011/0130904 | A1 * | 6/2011 | McGrogan et al. | 701/22 |
| 2011/0172860 | A1 * | 7/2011 | Janczak et al. | 701/22 |
| 2012/0065821 | A1 * | 3/2012 | Hessell et al. | 701/22 |
| 2012/0303191 | A1 * | 11/2012 | McGrogan et al. | 701/22 |
| 2013/0274967 | A1 * | 10/2013 | Tan et al. | 701/22 |
| 2014/0018983 | A1 * | 1/2014 | Diaz et al. | 701/22 |
| 2014/0018984 | A1 * | 1/2014 | Diaz et al. | 701/22 |
| 2014/0038776 | A1 * | 2/2014 | Heap et al. | 477/180 |

* cited by examiner

Primary Examiner — Jonathan M Dager (57) ABSTRACT

A powertrain system is configured to transfer torque to an output member. A method for controlling the powertrain system includes prioritizing a plurality of system torque constraint parameters. The system torque constraint parameters are sequentially applied in an order of descending priority. A feasible state for each of the sequentially applied system torque constraint parameters is determined. A solution set including the feasible states for all the sequentially applied system torque constraint parameters is determined, and employed to control operation of the powertrain system in response to an output torque request.

19 Claims, 2 Drawing Sheets

METHOD AND APPARATUS FOR CONTROLLING A MULTI-MODE POWERTRAIN SYSTEM

TECHNICAL FIELD

This disclosure is related to dynamic system controls associated with powertrain systems employing torque transmission devices.

BACKGROUND

The statements in this section merely provide background information related to the present disclosure. Accordingly, such statements are not intended to constitute an admission of prior art.

Known powertrain systems are configured to transfer torque from a torque actuator through a transmission device to an output member coupled to a driveline to effect propulsion of a vehicle. A powertrain system may be configured to transfer torque originating from multiple torque actuators through a multi-mode transmission device to an output member coupled to a driveline to effect propulsion. Such powertrain systems include hybrid powertrain systems, extended-range electric vehicle systems, and, electric vehicle systems. Control systems for operating such powertrain systems operate the torque actuators and apply selected torque transfer elements in the transmission to transfer torque in response to operator-commanded output torque requests, taking into account fuel economy, emissions, driveability, and other factors. Exemplary torque actuators include internal combustion engines and non-combustion torque machines. The non-combustion torque machines may include electric machines that operate as motors or generators to generate torque input to the transmission independently of torque input from the internal combustion engine. The torque machines may react torque, i.e., transform vehicle kinetic energy transferred through the vehicle driveline to electrical energy that is storable in an electrical energy storage device in what is referred to as a regenerative operation. A control system monitors inputs from the vehicle and the operator and provides operational control of the powertrain, including controlling an engine on/off state, controlling a transmission operating state, controlling the torque actuators, and regulating electrical power flow between the electrical energy storage device and the electric machines to manage transmission operation including torque and rotational speed.

Components employed in hybrid powertrain systems have operating limits that are determined based upon a physical capacity to perform an intended function, including, e.g., transferring torque, transferring electric power, or storing electric energy. Service life of a component may be reduced if a respective operating limit is violated. Operating limits include electric motor speed limits, engine speed limits, pinion gear speed limits of planetary gear sets, and battery power limits. Operating limits further include motor torque limits, engine torque limits, clutch torque limits, and belt torque limits. Operating limits also include electric limits including voltage and current limits. By way of example, service life of a high-voltage battery may be limited if either over-voltage or under-voltage limits are exceeded. Similarly, a service life of a switch in an electric inverter may be limited if an operating temperature is exceeded. Similarly, service life of a hydraulically activated clutch may be limited if an operating pressure is exceeded.

Control systems for hybrid powertrain systems impose system constraints based upon the operating limits to determine control parameters for operation during ongoing operation.

SUMMARY

A powertrain system is configured to transfer torque to an output member. A method for controlling the powertrain system includes prioritizing a plurality of system torque constraint parameters. The system torque constraint parameters are sequentially applied in an order of descending priority. A feasible state for each of the sequentially applied system torque constraint parameters is determined. A solution set including the feasible states for all the sequentially applied system torque constraint parameters is determined, and employed to control operation of the powertrain system in response to an output torque request.

BRIEF DESCRIPTION OF THE DRAWINGS

One or more embodiments will now be described, by way of example, with reference to the accompanying drawings, in which.

DETAILED DESCRIPTION

Figure 1:
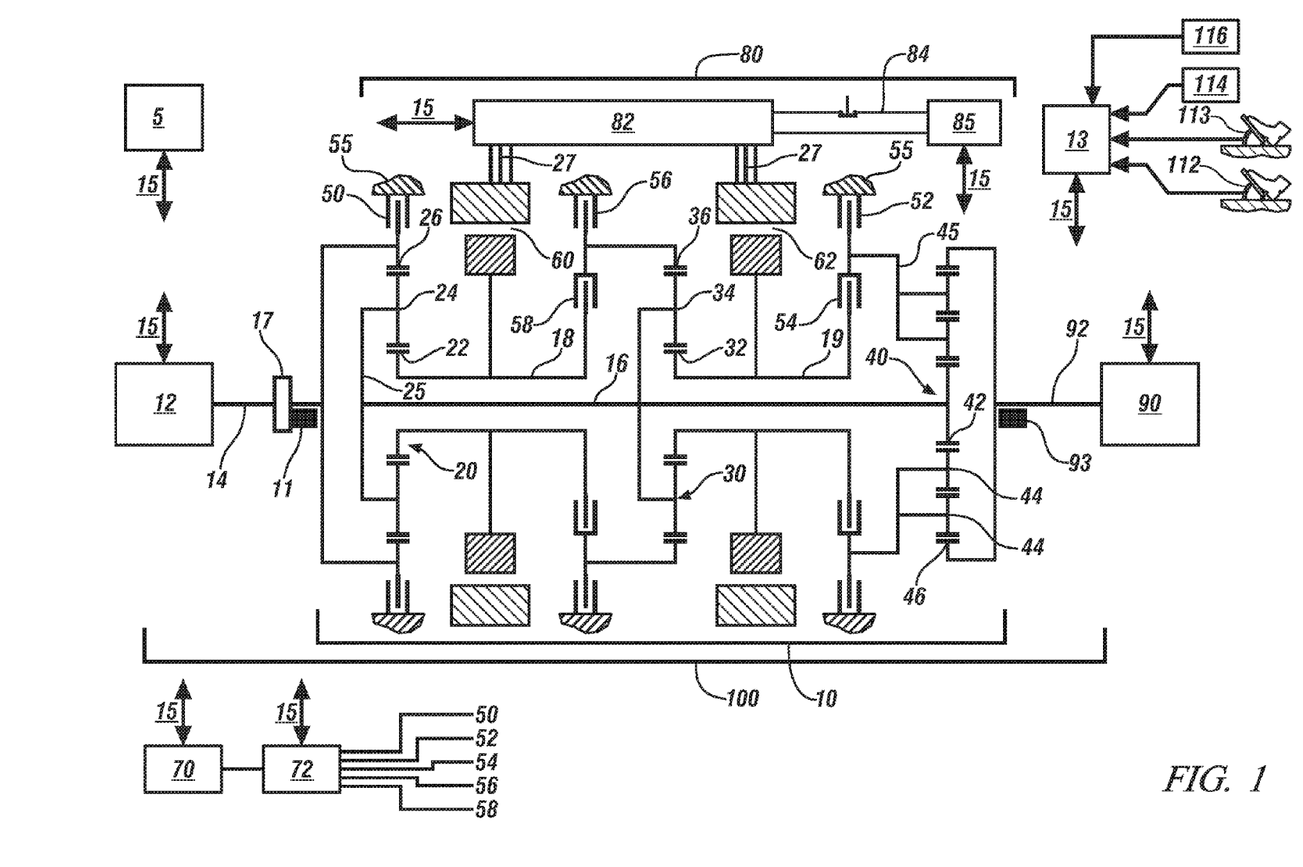
FIG. 1 illustrates a powertrain system including torque actuators, a multi-mode transmission, a high-voltage electrical system, a driveline, and a controller, in accordance with the disclosure.

Referring now to the drawings, wherein the showings are for the purpose of illustrating certain exemplary embodiments only and not for the purpose of limiting the same, FIG. 1 depicts a non-limiting hybrid powertrain system 100 including torque actuators including an internal combustion engine (engine) 12 and first and second non-combustion torque machines 60 and 62, respectively, and a multi-mode transmission (transmission) 10. The first and second non-combustion torque machines 60, 62 are electric motor/generators and a high-voltage electrical system 80 supplies electric power thereto. A controller 5 signally and operatively links to various actuators and sensors in the powertrain system 100 to monitor and control operation thereof. The transmission 10 mechanically couples to the engine 12 and the torque machines 60, 62, and is configured to transfer torque between the engine 12 and the torque machines 60, 62, through an output member 92 to a driveline 90 through selective activation of torque transfer devices, e.g., clutches.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14 and damper 17, and can be either a spark-ignition or a compression-ignition engine. The engine 12 includes a crankshaft coupled to the input member 14 of the transmission 10. A rotational speed sensor 11 monitors crank angle and rotational speed of the input member 14. The damper 17 is a device configured to damp and otherwise manage torque transfer between the engine 12 and the transmission 10. Power output from the engine 12, i.e., rotational speed multiplied by engine torque, can differ from the input speed and the input torque to the transmission 10 due to the torque damper 17 and other torque-consuming components on the input member 14 between the engine 12 and the transmission 10, e.g., a mechanically-powered hydraulic pump. The engine 12 is configured to execute autostop and autostart operations during ongoing powertrain operation in response to operating conditions. The controller 5 is configured to control actuators of the engine 12 to control combustion parameters including intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque transfer devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear set 30. Each of the resolvers is signally and operatively connected to the transmission power inverter control module TPIM 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the ESD 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system 100, including synthesizing information and inputs, and executing routines to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithm and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The hybrid powertrain system 100 is configured to operate in one of a plurality of powertrain states, including a plurality of engine states and transmission ranges to generate and transfer torque to the driveline 90. The engine states include an ON state and an OFF state. The engine 12 is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein all of the cylinders are unfueled, not firing, and not generating torque. The engine 12 can operate in the FCO state in response to an operator command for vehicle deceleration, such as occurs when the operator lifts their foot from the accelerator pedal 112, referred to herein as a decel-fuel cutoff state (dFCO). The engine 12 can be commanded to operate in the FCO state under non-deceleration operating conditions. When the engine is in the OFF state, it is not spinning. In one embodiment, operating with the engine in the OFF state can be accomplished by grounding rotation of the input member to the transmission case using a clutch or similar device. The transmission ranges include a plurality of neutral (neutral), fixed gear (Gear #), variable mode (EVT Mode #), electric vehicle (EV#) and transitional (EV Transitional Range# and Pseudo-gear #) ranges that are achieved by selectively activating the clutches C1 150, C2 152, C3 154, C4 156, and C5 158. A pseudo-gear range is a variable mode transmission range in which torque output from the transmission 10 corresponds to the input torque from the engine 12, taking into account torque losses associated with torque-consuming components on the input member 14. The pseudo-gear ranges can be employed as intermediate transmission ranges during shifts between EVT Mode ranges. Table 1 depicts a plurality of transmission ranges and engine states for operating the hybrid powertrain system 100.

TABLE 1

| Range | Engine State | C1 | C2 | C3 | C4 | C5 |
|---|---|---|---|---|---|---|
| Neutral 1 | ON/OFF | | | | | |
| Neutral 2 | ON/OFF | | x | | | |
| Neutral 3 | ON/OFF | | | x | | |
| PseudoGear 1 | ON | x | | | | |
| PseudoGear 2 | ON | | x | | | |
| Neutral | OFF | | | | | x |
| EVT Mode 1 | ON/OFF | x | | x | | |
| EVT Mode 2 | ON/OFF | x | | | x | |
| EVT Mode 3 | ON/OFF | | x | | x | |
| EVT Mode 4 | ON/OFF | | | x | x | |
| EV Transitional State 1 | OFF | x | | | | x |
| EV Transitional State 2 | OFF | | x | | | x |
| Gear 1 | ON | x? | | x | x | |
| Gear 2 | ON | x | x | | x | |
| Gear 3 | ON | | x | x | x | |
| EV1 | OFF | x | | x | | x |
| EV2 | OFF | x | | | x | x |
| EV3 | OFF | | x | | x | x |
| EV4 | OFF | | x | x | | x |
| EV Transitional State 3 | OFF | x | x | | | x |
| Neutral | ON/OFF | | | x | x | |
| PseudoGear 3 | ON | x | x | | | |
| Neutral | OFF | | | x | | x |
| Neutral | OFF | | | | x | x |

Figure 2:
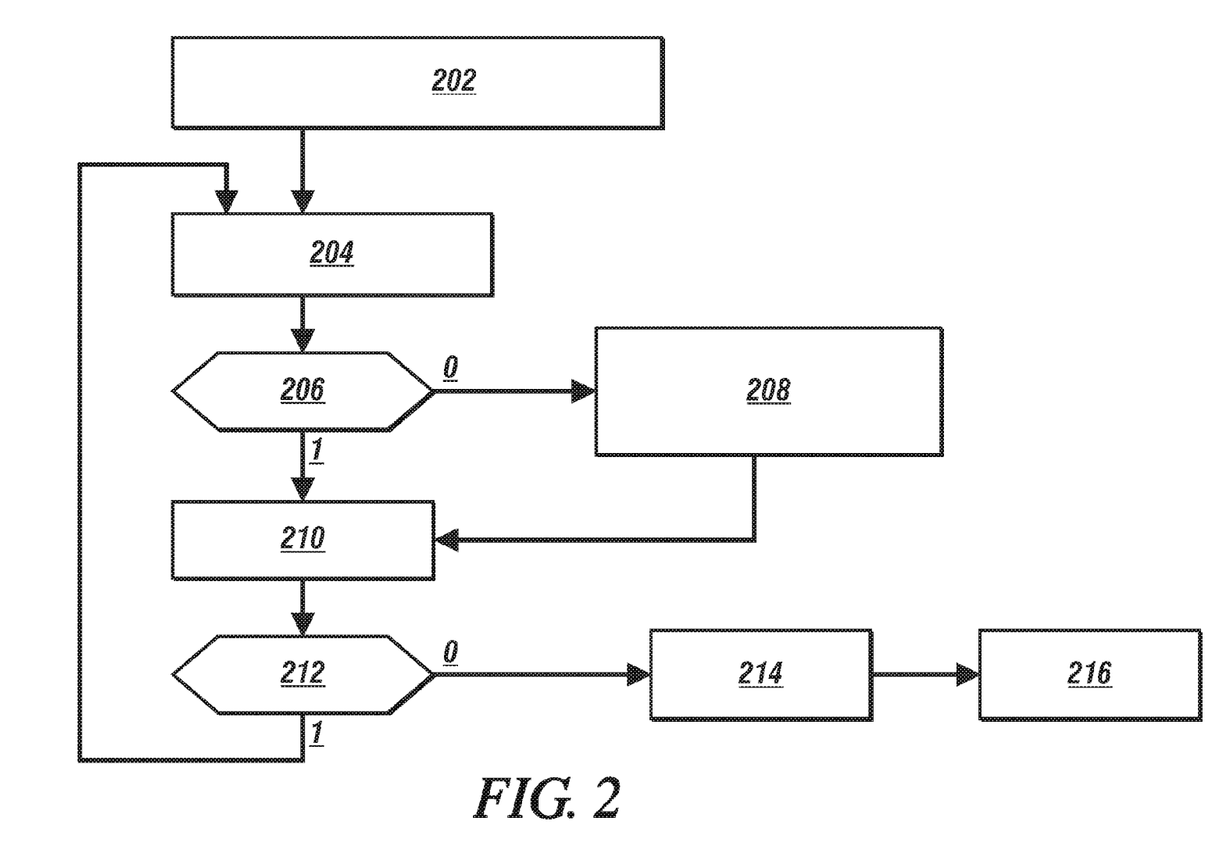
FIG. 2 illustrates a control scheme including a process for identifying, prioritizing and sequentially applying system torque constraints in a stepwise manner in descending priority to determine a feasible set of constraints associated with operating a hybrid powertrain system, in accordance with the disclosure.

FIG. 2 schematically shows an embodiment of a control scheme 200 that includes including a process for identifying, prioritizing and sequentially applying system torque constraints in a stepwise manner in descending priority to determine a feasible set of constraints. This process includes identifying and prioritizing a plurality of system torque constraint parameters. The system torque constraint parameters are sequentially applied in an order of descending priority. A feasible state for each of the sequentially applied system torque constraint parameters can be determined, and a solution set comprising the feasible states for all the sequentially applied system torque constraint parameters can be determined by iterative operation of the control scheme 200. The solution set is employed to control operation of the powertrain system in a selected transmission range and engine state responsive to an output torque request. The control scheme 200 is described with reference to an embodiment of the hybrid powertrain system 100 described with reference to FIG. 1, and may be employed on any suitable powertrain on which the concepts described herein apply. Table 2 is provided as a key to FIG. 2 wherein the numerically labeled blocks and the corresponding functions are set forth as follows.

TABLE 2

| BLOCK | BLOCK CONTENTS |
|---|---|
| 202 | Initialization<br>Define and prioritize constraints<br>Constraint A is highest priority |
| 204 | Constraint set A' = Constraint set A plus next highest priority constraint x |
| 206 | Is powertrain system operation feasible with Constraint set A'? |
| 208 | Redefine values of constraint x to nearest achievable value of x subject to constraint set A |
| 210 | Update constraint set A = constraint set A plus constraint x |
| 212 | Are there additional constraints? |
| 214 | Solution set (Ta, Tb, Te) = (Ta, Tb, Te) defined by constraint set A |
| 216 | Implement Solution set (Ta, Tb, Te) |

The control scheme 200 regularly and periodically executes during ongoing operation of the hybrid powertrain. Upon beginning operation of the vehicle and powertrain system, e.g., in response to an operator key-on, the system initializes, which includes defining and prioritizing a list of constraint parameters and identifying one of the constraints (Constraint A) as having highest priority (202). This operation may employ predetermined constraint and priority information, or alternatively, the constraints and priorities may be determined in response to other operations during a previous operating cycle. During each iteration, the system operation is monitored and evaluated in context of a selected transmission range and engine state responsive to an output torque request which is used to determine desired torque commands for the torque actuators, i.e., motor A torque, motor B torque, and engine torque. A new constraint set (Constraint A') is defined, and includes the present constraint set (Constraint A) and incorporates states for the next highest priority constraint (x) (204). The system determines whether the new constraint set (Constraint A') is feasible for operating the powertrain system at the state for the next highest priority constraint (x). The system determines whether powertrain system operation is feasible with the new constraint set (Constraint A') (206), and if so (206)(1), the present constraint set (Constraint A) is updated to incorporate the next highest priority constraint (x) (210). Determining whether powertrain system operation is feasible with the new constraint set includes executing a system solver in the form of a set of linear and/or non-linear system equations that take into account states of a plurality of system variables to determine whether the powertrain system operates responsive to the output torque request in the selected transmission range and engine state without violating the applied constraints of the new constraint set. Thus powertrain system operation is deemed feasible with the new constraint set when the present constraint set and the desired torque constraints associated with the new constraint set are simultaneously satisfied.

The system variables are related to each other through a set of predefined equations. The form of those equations, and the coefficients, are dependent upon the transmission configuration, the transmission range state (i.e., clutch state(s)), and properties of the transmission itself (e.g., tooth counts on gears, spin losses, mass moments of inertia of various components, motor efficiency maps, etc. The new constraint set (Constraint A') is said to be feasible for operating the powertrain system when the results from executing the system solver indicate that all of the presently applied constraints are met when the next highest priority constraint is applied.

When operation of the powertrain system found to be not presently feasible with the newly applied constraint set (Constraint A') (206)(0), the values of the next highest priority constraint (x) are redefined to the nearest achievable value of the next highest priority constraint (x) subject to the present constraint set A (208), and the present constraint set (Constraint A) is updated to incorporate the next highest priority constraint (x) as redefined (210).

The system evaluates whether there are additional constraints (212), and if so (212)(1), another iteration is executed by selecting and evaluating the next highest priority constraint. When all of the constraints have been evaluated and defined or redefined (212)(0), the solution set of torque commands for the torque actuators, i.e., motor A torque (Ta), motor B torque (Tb) and engine torque (Te) is defined and limited by the constraint set A, which have uniquely determined specific values, e.g., for Ta, Tb, Te, To, NiDot, TL1, TL2, and Pbat (214) and employed to control operation of the powertrain system (216). This iterative process of employing constraints to determine operational feasibility in a sequential, stepwise, hierarchical manner permits efficient application of the constraints without intensive evaluations. The process is adaptable to many or few constraints without additional routine development, and the selection and prioritization of all the constraints is fully configurable such that new constraints can be inserted easily due to the looping structure of the function. This facilitates a robust, efficient, generic, centralized, and easily expandable routine that directly determines the actuator torque commands which "best satisfy" all of the constraints placed on a fast actuator command determination area of the control system.

One operation of the control scheme 200 is described herein to illustrate the concept, employing an embodiment of the powertrain system 100 described with reference to FIG. 1. In this illustration, the powertrain system is operating in a series-hybrid mode with the engine in the ON state while the control scheme 200 sequentially applies the constraints in order from highest to lowest priority. During execution of the control scheme 200, application of each set of constraints is successful, as indicated by finding a feasible control set, or, the application of a new set of the constraints yields a control set that is not presently feasible. When the application of the most recent set of constraints yields a control set that is not presently feasible, the system solver performs constraint optimization to find a feasible control set for the constraint in context of all the presently applied constraints. The results are obtained employing a suitable powertrain simulation routine. The constraints, in order of priority from highest to lowest, can include the following:

Ta_ST: short-term motor A torque constraints, i.e., minimum and maximum torque constraints for the first torque machine 60;

Tb_ST: short-term motor B torque constraints, i.e., minimum and maximum torque constraints for the second torque machine 62;

Te_ST: short-term engine torque actuation limits;

Pbat-Hard: hard, inflexible battery power limits including minimum and maximum voltage limits and current limits;

NiDot-SpdCst: engine acceleration constraints related to avoiding spinning the engine backwards, avoiding stalling the engine, and minimizing operation in a speed zone associated with resonance, e.g., range of 300-500 RPM that occurs during autostart and autostop operations;

TL1_ST: short-term constraints to avoid induced clutch slip for a first applied clutch; and TL2_ST: short-term constraints to avoid induced clutch slip for a second applied clutch (when applied).

The engine acceleration constraints and short-term clutch slip constraints represent selected transmission component acceleration constraints, of which there could be several depending upon the powertrain configuration, e.g., front-wheel drive or rear-wheel drive, and the selected transmission range and engine state. Depending upon the selected transmission range, there can be one or a plurality of controlled accelerations, resulting in zero acceleration constraints, or states that have one, two, or three acceleration constraints, including both engine acceleration constraints and clutch slip acceleration constraints.

Other lower priority constraints, in order of priority from highest to lowest, can include the following:

Pbat-Soft: Soft, flexible battery power limits including minimum and maximum voltage limits and current limits, which may be violated for short periods of time depending upon operating conditions;

To_pfd: a desire to produce an output torque within a defined band of acceptable output torques;

Te: an engine torque constraint that avoids using spark retard;

NiDot-Desired: a calibrated unconstrained input acceleration;

TL1_LT: a constraint to offload torque from the first applied clutch to execute a torque phase;

TL2_LT: a constraint to offload torque from the second applied clutch to execute a torque phase; and To: commanded unconstrained output torque response.

In operation, the highest priority constraints include constraints on the actuator commands, including constraints on the motor A torque command (Ta) and the motor B torque command (Tb), followed by constraints on the engine torque (Te). An initial constraint space includes the motor A torque command (Ta), the motor B torque command (Tb), the engine torque (Te), output torque (To), engine acceleration (NiDot), first clutch torque (TL1), second clutch torque (TL2), and battery power (Pbat).

The various constraints are applied employing the non-linear system solver, which can indicate whether the constraints form a feasible set. The system solver can also indicate whether the constraints uniquely determine a particular solution. Initially, there can be an infinite number of points which satisfy the constraints, as the constraints have failed to dictate a unique solution. However, complete execution of the control scheme 200 yields a final set of constraints with uniquely determined specific values for Ta, Tb, Te, To, NiDot, TL1, TL2, and Pbat. The variables are related to each other through a set of predefined equations. The form of those equations, and the coefficients, are dependent upon the transmission range state (i.e., clutch state(s) and upon properties of the transmission itself (e.g., tooth counts on gears, spin losses, mass moments of inertia of various components, motor efficiency maps, etc.

The initial constraint set A is as follows, wherein Inf and −Inf represent positive and negative infinity.

| | Ta (Nm) | Tb (Nm) | Te (Nm) | To (Nm) | NiDot (RPM/Sec) | TL1 (Nm) | TL2 (Nm) | Pbat (kW) |
|---|---|---|---|---|---|---|---|---|
| Minimum Constraint | −100 | −200 | 30 | −Inf | −Inf | −Inf | −Inf | −Inf |
| Maximum Constraint | 100 | 200 | 110 | Inf | Inf | Inf | Inf | Inf |

The short-term engine torque constraints are the next highest priority. Minimum and maximum engine torque constraints of [30, 110] are applied, and the presently composed constraints are found to be feasible. The updated constraint set A, after operation 210, forms a feasible set as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | −Inf | −Inf | −Inf | −Inf | −Inf |
| Maximum Constraint | 100 | 200 | 110 | Inf | Inf | Inf | Inf | Inf |

The hard battery power limits are the next highest priority constraints. In this case, the routine chooses to impose non-limiting hard battery power constraints, i.e., sufficiently high so as to not become a limiting factor or limiting constraint or active constraint when applied this iteration. Alternatively, the routine may have been instructed to impose non-limiting constraints by some other routine. Non-limiting hard battery power limits of +/·999 kW are selected, minimum and maximum battery power constraints of [−999, 999] are applied. The updated constraint set A, after operation 210, forms a feasible set as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | −Inf | −Inf | −Inf | −Inf | −999 |
| Maximum Constraint | 100 | 200 | 110 | Inf | Inf | Inf | Inf | 999 |

The engine acceleration constraints related to avoiding spinning the engine backwards, avoiding stalling the engine and minimizing operation in a speed zone associated with resonance are the next highest priority. Minimum and maximum engine speed constraints of [−800, 800] are applied. The updated constraint set A, after operation 210, forms a feasible set as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | −Inf | −800 | −Inf | −Inf | −999 |
| Maximum Constraint | 100 | 200 | 110 | Inf | 800 | Inf | Inf | 999 |

The short-term constraints to avoid induced clutch slip for the first applied clutch (TL1) are the next highest priority. Minimum and maximum TL1 constraints of [−350, 350] are applied, and the updated constraint set A, after operation 210, forms a feasible set as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | −Inf | −800 | −350 | −Inf | −999 |
| Maximum Constraint | 100 | 200 | 110 | Inf | 800 | 350 | Inf | 999 |

The short-term constraints to avoid induced clutch slip for second applied clutch (TL2) are the next highest priority. Minimum and maximum TL2 constraints of [−150, 150] are applied, and the updated constraint set A, after operation 210, forms a feasible set as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | −Inf | −800 | −350 | −150 | −999 |
| Maximum Constraint | 100 | 200 | 110 | Inf | 800 | 350 | 150 | 999 |

The soft battery power limits, i.e., the flexible battery power limits (Pbat-soft) are the next highest priority. Minimum and maximum Pbat constraints of [−6, 6] are applied, and the updated constraint set A, after operation 210, forms a feasible set as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | −Inf | −800 | −350 | −150 | −6 |
| Maximum Constraint | 100 | 200 | 110 | Inf | 800 | 350 | 150 | 6 |

The desired or preferred output torque (To_pfd) is the next highest priority torque constraint. Minimum and maximum To_pfd constraints of [98 102] are applied, referred to as constraint set A' as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | 98 | −800 | −350 | −150 | −6 |
| Maximum Constraint | 100 | 200 | 110 | 102 | 800 | 350 | 150 | 6 |

Executing the system solver using the constraint set A' as shown above indicates that a feasible solution based upon the constraint set A' is not initially found, so the routine invokes the nonlinear programming system solver. The system solver employs the set of constraints A, and not constraints A', and the constraint that was just added [To_pfd in this example] is not included as a constraint. The system solver is asked to find the value of output torque To that is as close to the original constraint range for the output torque, i.e., [98 102], while satisfying the set of constraints A. In this example, the system solver found that the closest solution to the original constraint range [98 102] was an output torque value of 82 Nm, because an output torque greater than 82 Nm would have violated at least one of the constraints contained in constraint set A.

The optimization routine determines that a magnitude of output torque To_pfd of 82 is as close as can be obtained with the constraints, and the updated constraint set A, after operation 210, forms a feasible set as follows, when applied.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 30 | 82 | −800 | −350 | −150 | −6 |
| Maximum Constraint | 100 | 200 | 110 | 82 | 800 | 350 | 150 | 6 |

The engine torque constraint that avoids using spark retard (Te=Te_air) is the next highest priority. Minimum and maximum Te_air constraints of [90 90] are applied, but the constraint set A' does not initially yield a feasible set of constraints, as follows.

| | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 90 | 82 | −800 | −350 | −150 | −6 |
| Maximum Constraint | 100 | 200 | 90 | 82 | 800 | 350 | 150 | 6 |

Executing the system solver using the constraint set A' as shown above indicates that a feasible solution based upon the constraint set A' is not initially found, so the routine again invokes the system solver. The system solver employs the set of constraints A, and not constraints A', and the constraint that was just added [Te_air in this example] is not included as a constraint. The system solver is asked to find the value of output torque Te_air that is as close to the original constraint range for the engine air torque, i.e., [90 90], while satisfying the set of constraints A. In this example, the system solver found that the closest solution to the original constraint range [90 90] was an engine air torque value of 85 Nm, which is less than the air torque constraint of 90 Nm, requiring implementation of spark retard to control engine torque for a period of time until engine air torque can adjust. The system solver thus determine that a magnitude of Te of 85 Nm is as close as can be obtained within the presently applied constraints, and the updated constraints set A, after operation 210, forms a feasible set as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 85 | 82 | −800 | −350 | −150 | −6 |
| Maximum Constraint | 100 | 200 | 85 | 82 | 800 | 350 | 150 | 6 |

Minimum and maximum calibrated unconstrained input acceleration constraints of [20 20] are the next highest priority and are applied, but a feasible solution based upon the constraint set A' is not initially found, as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 85 | 82 | 20 | −350 | −150 | −6 |
| Maximum Constraint | 100 | 200 | 85 | 82 | 20 | 350 | 150 | 6 |

The optimization routine determines that a magnitude of NiDot of −800 is as close as can be obtained with the presently applied constraints, and the updated constraint set A, after operation 210, forms a feasible set as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 85 | 82 | −800 | −350 | −150 | −6 |
| Maximum Constraint | 100 | 200 | 85 | 82 | −800 | 350 | 150 | 6 |

The constraint to offload torque from the first applied clutch to execute a torque phase (TL1_LT) is the next highest priority. Minimum and maximum TL1_LT constraints of [−350 350] are applied, and the updated constraint set A, after operation 210, forms a feasible set as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 85 | 82 | −800 | −350 | −150 | −6 |
| Maximum Constraint | 100 | 200 | 85 | 82 | −800 | 350 | 150 | 6 |

The constraint to offload torque from the second applied clutch to execute a torque phase (TL2_LT) is the next highest priority. Minimum and maximum TL2_LT constraints of [−40 40] are applied, but a feasible solution is not initially found, as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 85 | 82 | −800 | −350 | −40 | −6 |
| Maximum Constraint | 100 | 200 | 85 | 82 | −800 | 350 | 40 | 6 |

The optimization routine determines that a magnitude of TL2_LT of 94 is as close as can be obtained with the presently applied constraints. The updated constraint set A, after operation 210, forms a feasible set as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Minimum Constraint | −100 | −200 | 85 | 82 | −800 | −350 | 94 | −6 |
| Maximum Constraint | 100 | 200 | 85 | 82 | −800 | 350 | 94 | 6 |

The output torque (To) has previously been constrained due to other, higher priority constraints, and is the next highest priority. Minimum and maximum output torque To constraints of [82 82] are applied. The updated constraint set A, after operation 210, forms a feasible set as follows.

|  | Ta (Nm) | Tb (Nm) | Te (Nm) | To (Nm) | NiDot (Nm) | TL1 (Nm) | TL2 (Nm) | Pbat (Nm) |
|---|---|---|---|---|---|---|---|---|
| Solution | −100 | 25 | 85 | 82 | −800 | −56 | 94 | 6 |
| Minimum Constraint | −100 | −200 | 85 | 82 | −800 | −350 | 94 | −6 |
| Maximum Constraint | 100 | 200 | 85 | 82 | −800 | 350 | 94 | 6 |

This analysis yields a complete set of constraints that can be applied to operate the system and a corresponding solution set. The minimum and maximum constraints uniquely define a single solution set, as shown. The control system can employ the engine torque and motor torque commands (Te, Ta, Tb) to control operation of the powertrain system.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system configured to transfer torque among a plurality of torque actuators, a multi-mode transmission and an output member, comprising:
   in response to an output torque request:
   prioritizing a plurality of system torque constraints;
   sequentially applying the system torque constraints in an order of descending priority;
   determining a feasible state for each of the sequentially applied system torque constraints;
   determining a solution set comprising the feasible states for all the sequentially applied system torque constraints; and employing the solution set to control operation of the powertrain system.

2. The method of claim 1, wherein prioritizing the plurality of system torque constraints comprises prioritizing system torque constraint parameters including minimum and maximum torque constraints for torque actuators comprising non-combustion torque machines and an internal combustion engine.

3. The method of claim 2, wherein prioritizing the plurality of system torque constraint parameters further comprises prioritizing system torque constraint parameters comprising battery power limits.

4. The method of claim 3, wherein prioritizing the plurality of system torque constraint parameters further comprises prioritizing system torque constraint parameters comprising transmission component acceleration constraints.

5. The method of claim 4, wherein prioritizing the plurality of system torque constraint parameters further comprises prioritizing system torque constraint parameters comprising short-term constraints to avoid induced clutch slip for an applied clutch.

6. The method of claim 1, wherein determining the feasible state for each of the sequentially applied system torque constraints comprises:
defining a constraint set including feasible states of the system torque constraints having a highest priority;
defining a new constraint set including states for a system torque constraint having a next highest priority;
determining whether the new constraint set is feasible for operating the powertrain system; and
updating the constraint set to incorporate the new constraint set including the states for the system torque constraint having the next highest priority when the new constraint set is feasible for operating the powertrain system.

7. The method of claim 6, wherein determining whether the new constraint set is feasible for operating the powertrain system comprises executing system equations to determine whether the powertrain system operates responsive to the output torque request in a selected transmission range and an engine state without violating the new constraint set.

8. The method of claim 6, wherein determining whether the new constraint set is feasible for operating the powertrain system comprises determining whether the constraint set and the states for the system torque constraint parameter having next highest priority are simultaneously satisfied.

9. The method of claim 6, further comprising:
adjusting the states for the system torque constraint having the next highest priority when the new constraint set is not feasible for operating the powertrain system, said adjusted states for the system torque constraint having the next highest priority determined to be feasible for operating the powertrain system employing the constraint set; and
updating the constraint set to include the adjusted states for the system torque constraint having the next highest priority.

10. A method for controlling a multi-mode powertrain system configured to transfer torque to an output member, comprising:
prioritizing a plurality of system torque constraint parameters;
sequentially applying the system torque constraint parameters in an order of descending priority;
determining a feasible state for each of the sequentially applied system torque constraint parameters;
determining a solution set comprising the feasible states for all the sequentially applied system torque constraint parameters; and
employing the solution set to operate the powertrain system.

11. The method of claim 10, wherein prioritizing the plurality of system torque constraint parameters comprises prioritizing system torque constraint parameters including minimum and maximum torque constraints for torque actuators comprising non-combustion torque machines and an internal combustion engine.

12. The method of claim 11, wherein prioritizing the plurality of system torque constraint parameters further comprises prioritizing system torque constraint parameters comprising battery power limits.

13. The method of claim 12, wherein prioritizing the plurality of system torque constraint parameters further comprises prioritizing system torque constraint parameters comprising transmission component acceleration constraints.

14. The method of claim 13, wherein prioritizing the plurality of system torque constraint parameters further comprises prioritizing system torque constraint parameters comprising short-term constraints to avoid induced clutch slip for an applied clutch.

15. The method of claim 10, wherein determining the feasible state for each of the sequentially applied system torque constraint parameters comprises:
defining a constraint set including feasible states of the system torque constraint parameters having a highest priority;
defining a new constraint set including states for a system torque constraint parameter having a next highest priority;
determining whether the new constraint set is feasible for operating the powertrain system; and
updating the constraint set to incorporate the new constraint set including the states for the system torque constraint parameter having the next highest priority when the new constraint set is feasible for operating the powertrain system.

16. The method of claim 15, wherein determining whether the new constraint set is feasible for operating the powertrain system comprises executing system equations to determine whether the powertrain system operates responsive to an output torque request in a selected transmission range and engine state without violating the new constraint set.

17. The method of claim 15, wherein determining whether the new constraint set is feasible for operating the powertrain system comprises determining whether the constraint set and the states for the system torque constraint parameter having next highest priority are simultaneously satisfied.

18. The method of claim 15, further comprising:
adjusting the states for the system torque constraint parameter having the next highest priority when the new constraint set is not feasible for operating the powertrain system, said adjusted states for the system torque constraint parameter having the next highest priority determined to be feasible for operating the powertrain system employing the constraint set; and
updating the constraint set to include the adjusted states for the system torque constraint parameter having the next highest priority.

19. A method for controlling a powertrain system configured to transfer torque among a plurality of torque actuators, a multi-mode transmission and an output member, comprising:
identifying a plurality of system torque constraints;
prioritizing the system torque constraints;
applying the system torque constraints stepwise in an order of descending priority, including determining feasibility of simultaneously satisfying the stepwise-applied system torque constraints responsive to each of the applied system torque constraints;
determining a solution set comprising the feasible states for all the stepwise-applied system torque constraints; and
employing the solution set to operate the powertrain system.

* * * * *